May 2, 1933.  W. K. BURGESS  1,906,737
VEHICLE WHEEL
Filed Sept. 6, 1929  5 Sheets-Sheet 1
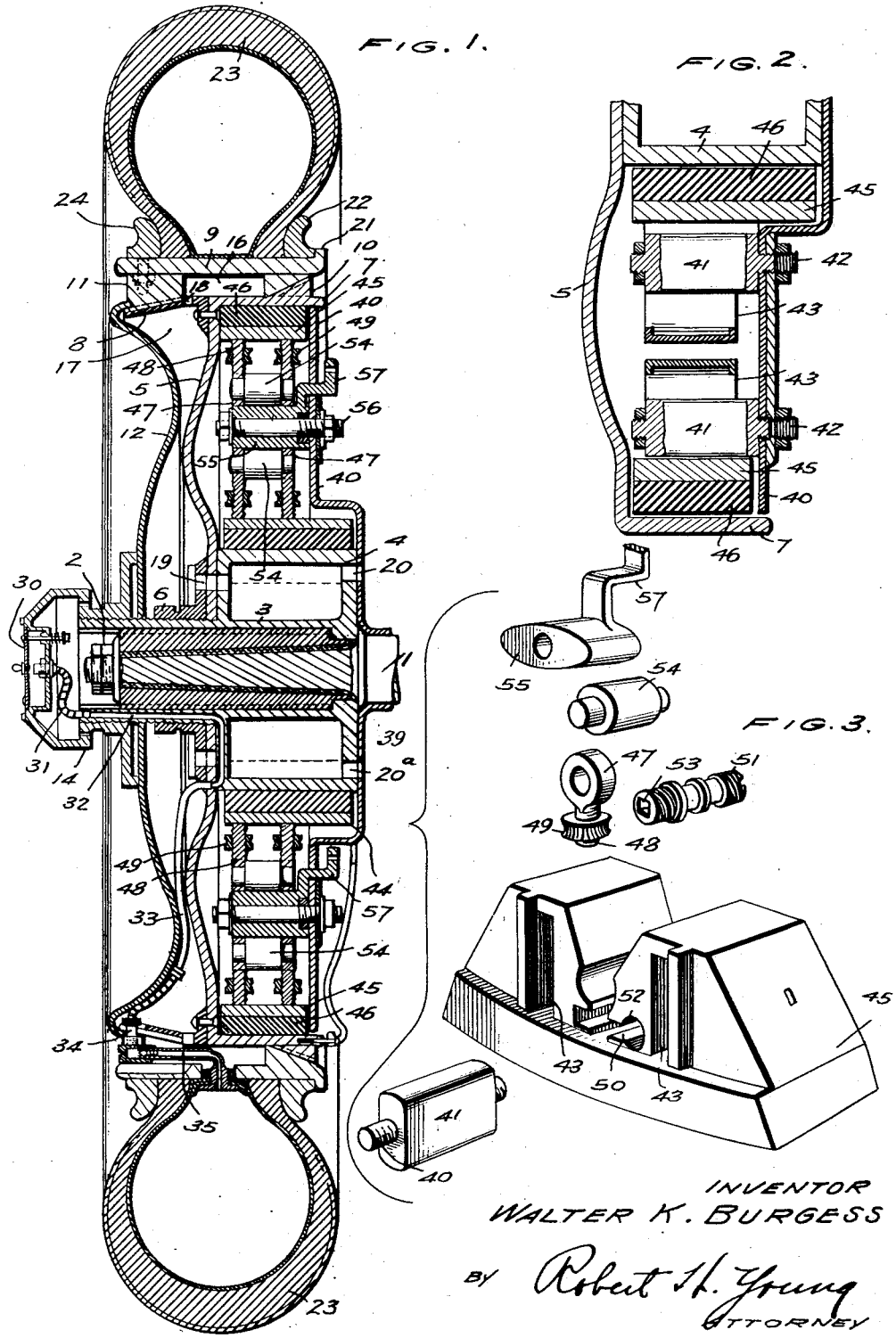
INVENTOR
WALTER K. BURGESS
BY Robert H. Young
ATTORNEY May 2, 1933.  W. K. BURGESS  1,906,737
VEHICLE WHEEL
Filed Sept. 6, 1929   5 Sheets-Sheet 2

INVENTOR
WALTER K. BURGESS
BY Robert H. Young
ATTORNEY

May 2, 1933.  W. K. BURGESS  1,906,737
VEHICLE WHEEL
Filed Sept. 6, 1929   5 Sheets-Sheet 3
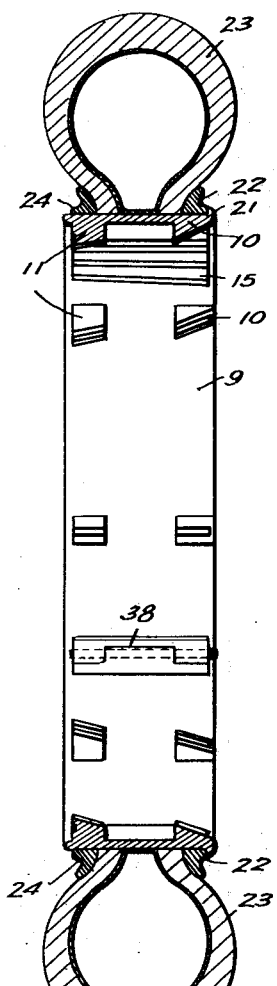
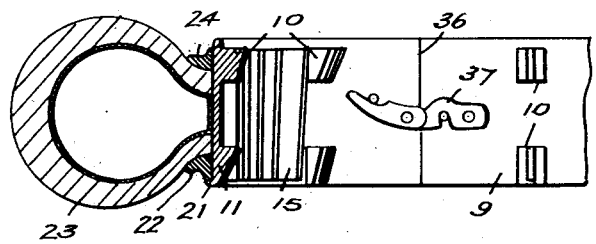
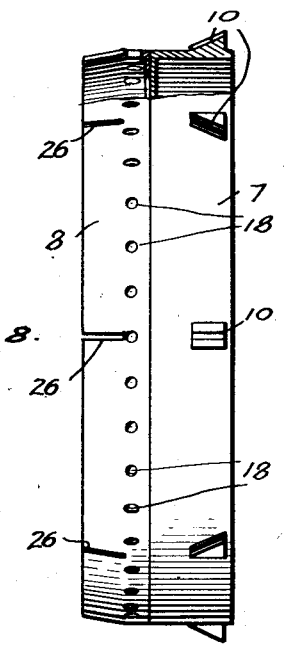
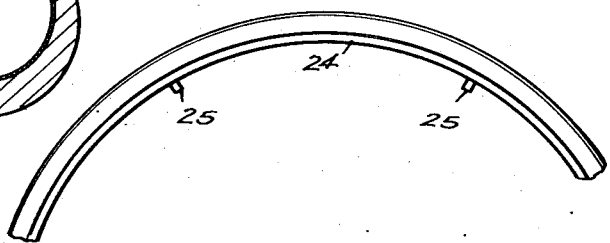
INVENTOR
WALTER K. BURGESS
BY Robert H. Young
ATTORNEY

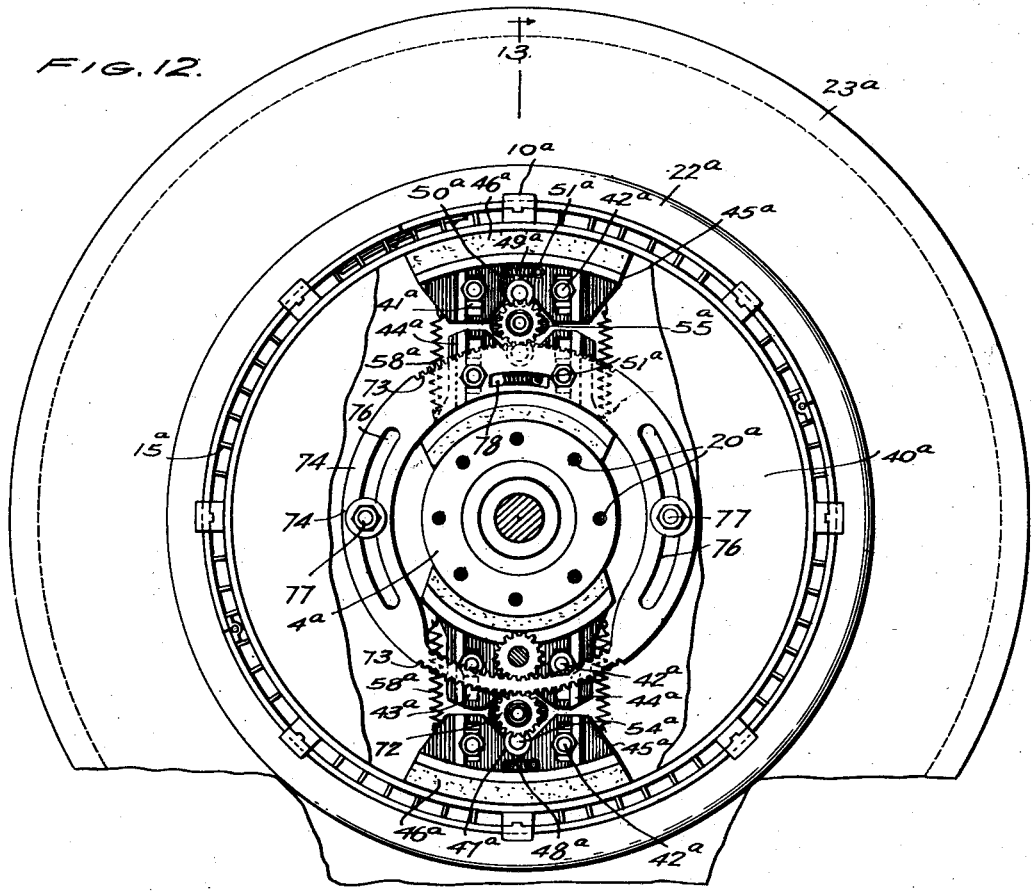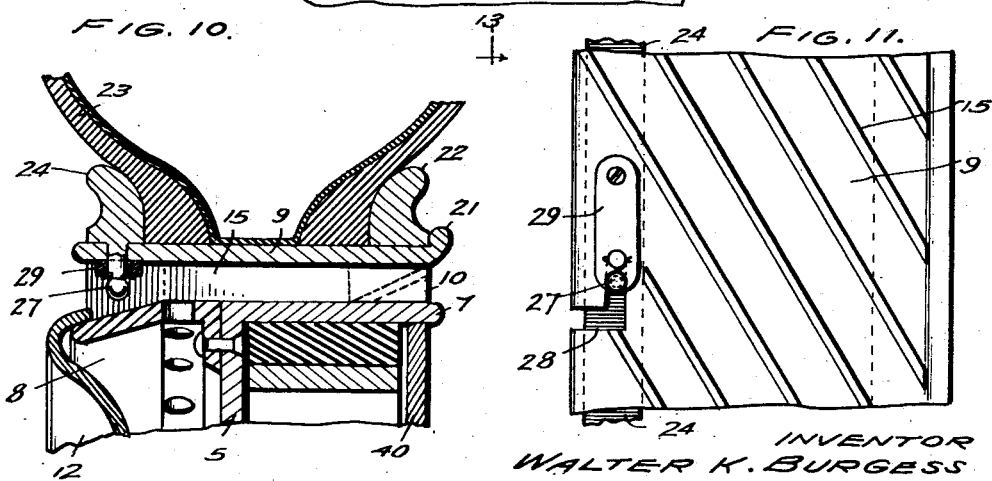

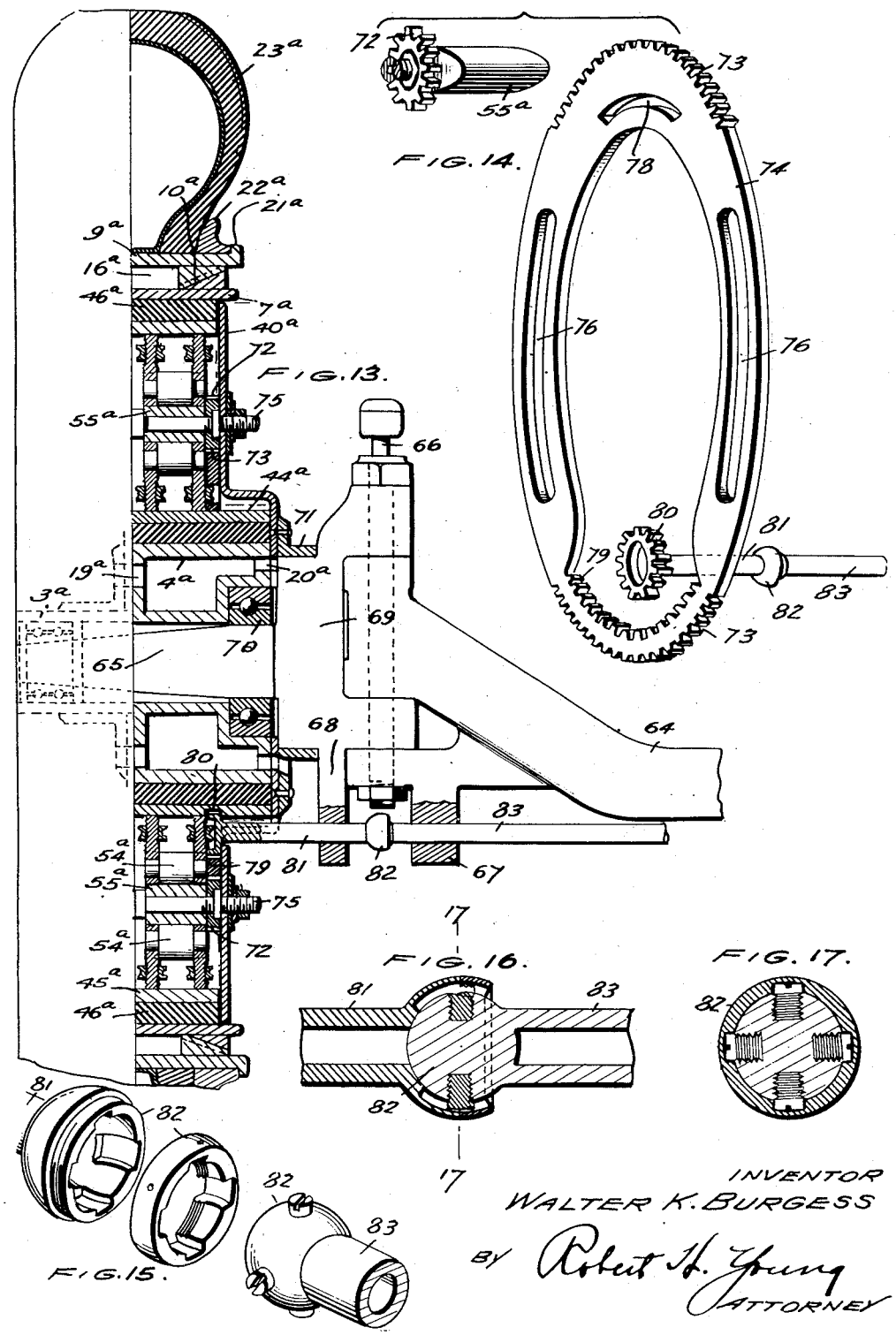

Patented May 2, 1933

1,906,737

UNITED STATES PATENT OFFICE

WALTER K. BURGESS, OF URBANA, ILLINOIS

VEHICLE WHEEL

Application filed September 6, 1929. Serial No. 390,813.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

One of the objects is to provide a double brake mechanism, capable of being applied, at once, to inner and outer drums on a wheel, such as a vehicle wheel, the construction being such that an unusually effective brake will result. Another object of the invention is to provide novel means for actuating a brake mechanism of the class described. A further object of the invention is to provide novel means for cooling the brake drums when brakes are being used and for cooling and controlling the heat of the casing. Still another object of the invention is to supply novel means whereby the casing on the vehicle wheel may be inflated from a point closely adjacent to the center of rotation of the wheel.

Generally stated, the invention aims to improve, and to enhance the utility of devices of that class to which it appertains.

Preferred forms have been shown, but it is to be understood, that, within the scope of what is claimed, a mechanic may make such changes as his skill may suggest, without departing from the spirit of the invention.

In the accompanying drawings:

Fig. 1 shows in transverse section, a rear wheel constructed in accordance with the invention;

Fig. 2 is a fragmental section showing the means whereby the brake shoes are guided as they move toward and away from the drums with which they cooperate;

Fig. 3 is a composite perspective view illustrating one of the brake shoes and parts associated therewith;

Fig. 6 is a sectional view showing the demountable rim;

Fig. 7 is a fragmental sectional view of the demountable rim, the view illustrating the latch mechanism;

Fig. 8 is an elevation of the main rim or brake drum, parts being broken away;

Fig. 9 is a fragmental sectional view, illustrating one of the retaining rings for the tire casing;

Fig. 10 is a sectional view on an enlarged scale, showing the rims and the latch mechanism whereby one of the retaining rings for the tire casing is held in place;

Fig. 11 is a plan of that part of the demountable rim which is depicted in Figure 10;

Fig. 12 is an elevation showing the construction employed in connection with the front wheel of a vehicle, parts being broken away;

Fig. 13 is a section taken approximately on the line 13—13 of Fig. 12;

Fig. 14 is a composite perspective view disclosing the mechanism whereby the brake shoes are operated in the form disclosed in Fig. 13;

Fig. 15 is a composite perspective view illustrating the universal joint employed in the form which constitutes the subject of illustration in Fig. 13;

Fig. 16 is a longitudinal section of the aforesaid joint;

Fig. 17 is a cross section on the line 17—17 of Fig. 16.

Figure 4:
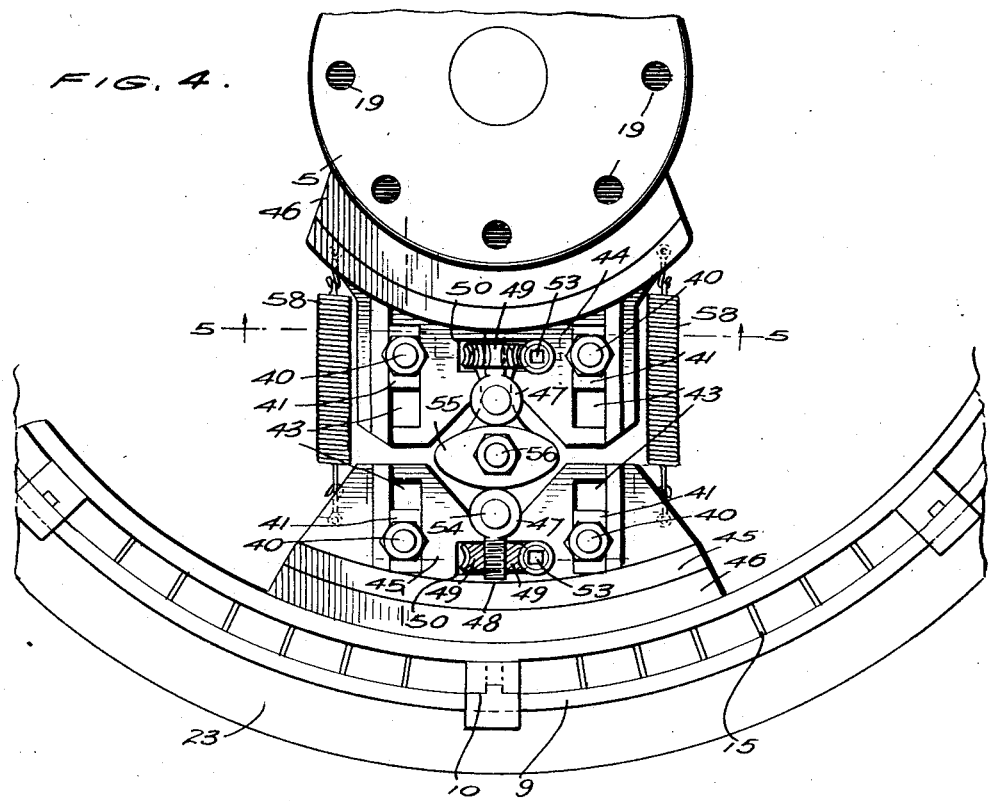
Fig. 4 is a fragmental elevation, parts being broken away and removed, in order that the brake shoes and associated parts may be more clearly shown.
Figure 5:
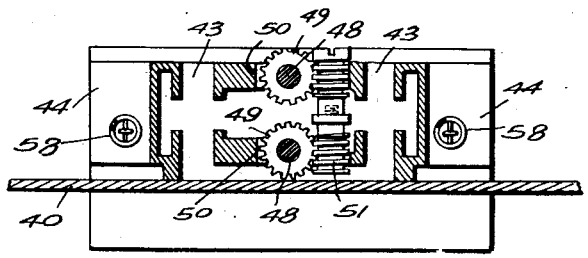
Fig. 5 is a fragmental section on the line 5—5 of Figure 4.

Referring to the form shown, for instance, in Figs. 1 and 4 and used on the rear wheel of a motor car, the numeral 1 designates a power driven rear axle, to which is secured at 2, a wheel hub 3, including a hollow inner brake drum 4. The body of the wheel may be in the form of a disc 5, held on the hub 3, and against one end of the drum 4, by a nut 6, which is threaded on the hub 3. The wheel body 5 carries at its periphery, an outer brake drum and main rim 7, in the form of a laterally extended annular flange. The main rim of the vehicle wheel comprises an annular side extension 8 secured to the wheel body 5.

About the main rim 7 is located a demountable rim 9, the demountable rim 9 and the main rim 7 being provided with cooperating lugs 10 which are tongued and grooved together. The lugs 10 are located at one edge of the wheel, and at the opposite edge of the wheel, the demountable rim 9 is provided with lugs 11 having tongue and groove engagement with the extension 8 of the main rim 7. The demountable rim 9 is seated, when it is in the position of Figure 1, and it is held in that position, removably, by a retaining disc 12 engaging the lugs 11, the disc being held upon the hub 3 by a cap 14, which is threaded on the outer end of the hub 3.

There is a space 16 between the main rim or drum 7 and the demountable rim 9, and in the aforesaid space are located vanes 15 which have a pronounced inclination circumferentially of the wheel as shown in Figure 11. The vanes 15 are mounted on the demountable rim 9. They have been omitted in part, in Figures 6 and 7.

There is a chamber 17 between the retaining disc 12 and the wheel body 5. Openings 18 in the extension 8 establish communication between the space shown at 16, and the chamber 17. Openings 19 establish communication between the chamber 17 and the inside of the hollow brake drum 4, the openings being disposed in the flange of the nut 6, in the wheel body 5, and in one end of the brake drum 4. In the opposite end of the brake drum 4, there are openings 20.

When the wheel is rotating air is drawn in from the outside of space 16 passing over and around cooling fins 15 and discharged from the inside of space 16. This action is due to the manner of setting of these fins.

The demountable rim 9 is divided transversely at 36 (Figure 7) and the constituent members of the rim are hinged together as at 38 (Figure 6) to the end that the rim may the more easily be assembled with the casing 23 which the rim carries. The relatively movable ends of the demountable rim 9 are held together detachably by the latch mechanism 37 of Figure 7; this portion of the device may be of any suitable construction such as that shown in Fig. 7, wherein the latch is held in locked position by a simple cam action as indicated in the drawing.

Any preferred means may be supplied for retaining the casing 23 on the rim 9. One satisfactory means to this end embodies a retaining ring 22, engaged with a shoulder 21, and a ring 24 located opposite to the ring 22, the casing 23 being engaged between the rings. The ring 24, may be supplied with inwardly projecting lugs 25 received in slots 28 (of any desired shape) fashioned at the edge of the extension 8, of the main rim 7. It appears in Figure 10 that the ring 24 has a keeper pin 27 adapted to be received in an L-shaped slot 28 (Figure 11) in the edge of the demountable rim 9. A spring latch 29, on the rim 9 cooperates with the keeper pin 27.

Reverting to Figure 1, it is to be observed that the hub cap 14 is provided with a movable lid 30 behind which is housed the intake end of a tube 31, communicating with a passage 32 in the wheel hub 3 in the inner brake drum 4. The inner end of the tube 33 communicates with the passage 32, the tube being located in the chamber 17. The outer end of the tube 33 is joined to a flexible coupling which is connected to a tube, the coupling being marked by the numeral 34, and the tube being designated by the numeral 35. The tube 35 is carried by and in communication with the tire casing 23. The lid 30 may be opened, and then, from a point adjacent to the axis of rotation of the wheel, air may be forced into the casing 23 through a conduit comprising the tube 31, the passage 32, the tube 33, the coupling 34, and the tube 35.

It has been pointed out hereinbefore that the device comprises an outer brake drum 7 and an inner brake drum 4. The brake mechanism which cooperates with the aforesaid drums will now be described.

An axle casing 39 is provided, and carries a support 40, in the form of a disc, the part 40 being denominated a support, because it is the means whereby the brake shoes, and attendant parts, are supported. Guides 41 are provided and, as shown in Figures 2 and 3, are in the form of blocks secured to the support or disk 40 at 42. The guides 41 are received slidably in slots 43 (Figure 4) formed in inner brake shoes 44 and outer brake shoes 45, the guides 41 retaining the brake shoes 44 and 45 for sliding movement toward and away from each other, so that the outer brake shoe 45 may cooperate with the outer brake drum 7, the inner brake shoe 44 cooperating with the inner brake drum 4. The brake shoes 44 and 45 are of metal and may be supplied with friction facings 46 of metal or other suitable material such as fiber, wood, or blocks composed of an assemblage of short sections of brake lining placed on edge and secured within the brake block in such manner as to present their several edge surfaces to the brake drum.

Bearings 47 are provided, and have stems 48 which are threaded into worm wheels 49. The worm wheels 49 operate in openings 50 in the brake shoes 44 and 45, as Figure 4 will show. Each worm wheel 49, cooperates with a worm 51, journaled in a bearing opening 50 in the corresponding brake shoe, this detail being shown in connection with the brake shoe 45 of Figure 3. Each worm 51 is supplied on its end with a socket 53, adapted for the reception of a key (not shown). The reduced ends of rollers 54 are journaled in the bearings 47, each of the brake shoes 44—45 being supplied with a roller, attention being directed at this point to the showing of Figures 1 and 4. The brake shoes 44 and 45 are connected by retractable springs 58 which tend to draw the brake shoes toward each other and prevent them from dragging on the respective drums 4 and 7, when the brakes are not applied.

A means is provided for actuating the shoes 44 and 45, to cause them to cooperate, respectively, with the brake drums 4 and 7, the said means preferably being a cam 55, disclosed in perspective in Figure 3, and shown in place between the rollers 54 in Figure 1. The cam 55 is mounted to rock on a stub shaft 56 secured in the disk-like support 40. The mechanism for imparting swinging movement to the cam 55, to cause it to cooperate with the anti-friction devices 54 of the shoes 44 and 45, may be of different forms, depending on whether the brakes are located on the forward or rear wheels of the vehicle; but since the forward wheels are presently under consideration, it may be stated that the cams 55 have angular arms 57, mounted to move in slots in the support 40, and capable of being connected to any appropriate means (not shown) whereby the brakes may be applied from a remote point.

So far as the practical operation of the device is concerned, the casing 23 can be inflated from the center of rotation of the wheel, when the lid 30 is opened, through an air conduit including the tube 31, the passage 32, the tube 33, the coupling 34, and the tube 35. When the wheel rotates, the vanes 15 direct the air from the outside of the wheel and out on the inside of said space into the space at 16, to cool the outer brake drum 7.

In like manner air is drawn in through opening 20 on the inside of the inner brake drum 4, cools that drum and is discharged through openings 19 into chamber 17. Centrifugal force throws this air to the peripheral section of chamber 17 where it passes out openings 18 meeting at right angles the current of air coming in at 11 outside and passing out at 11 (inside). Chamber 17 is a concentric Venturi tube which accelerates the passage of the air current from 19—18. Fins in space 11 move faster than like fins in the inner drum since in rotating about hub S they describe a greater circle. The outer air current is stronger and passes the current emerging from opening 18 at right angles causing a marked suction at opening 18 again increasing the speed of the flow over the cooling fins of the inner drum. This latter acceleration varies in force directly with the speed of the wheel and results in effectually equalizing the cooling force of both drums. As to the operation of the brake mechanism, the cam 55 is tilted on its mounting 56, by means of the arm 57, the cam cooperating with the antifriction rollers 54 to advance the outer brake shoe 45 on the outer drum and to advance the inner brake shoe 44 on the inner drum 4 simultaneously, a very efficient brake being provided, not only because there are two drums, but as well because there are two shoes which engage each drum, the shoes being located in pairs, on opposite sides of the axis of rotation of the wheel.

When a wrench or key (not shown) is inserted into the socket 53 of the worm 51, the worm is rotated, and the rotation is imparted to the worm wheels 54, and because the stems 48 of the bearings 47 are threaded into the worm wheels, the bearings 47 and the rollers 54 may be adjusted with respect to the operating cam 55.

Passing now to the structure employed with the front wheels of the vehicle, attention is directed particularly to Figures 12, 13, and 14. Owing to the similarity of the mechanism embodied in the front and rear wheels, the description of the front wheel mechanism may be shortened materially, and in Figures 12, 13, and 14, parts hereinbefore described have been designated by numerals already used, with the suffix "a".

The front axle of the vehicle is shown at 64, and at 69 there appears a knuckle, carrying a stub axle 65, the knuckle being mounted at 66 on the front axle 64 for horizontal swinging movement as governed by the steering mechanism (not shown). The front axle 64 carries a depending bearing 67, and on the knuckle 69 there is a depending bearing 68. The front wheel is journaled and held in the usual way, for rotation, on the stub axle 65 and the showing at 70 indicates that anti-friction bearings may be used wherever necessary. The support 40a is secured at 71 to a knuckle 69.

The chief distinguishing characteristic of the form under consideration is the means for operating the cam 55a. Pinions 72 are secured to the cams and the cams and pinions rock on stub shafts 75 carried by the support 40a. The pinions 72 mesh with external gears 73 on rings 74 having each an internal gear 79 meshing with a pinion 80 on one member 81 of a shaft, said member being journaled in the bearing 68 (Figure 14) on the knuckle 69. A shaft member 83 is journaled in the bearing 67 on the front axle 64. The shaft members 83 and 81 are connected by a universal joint 82. For the guidance of a mechanic, the universal joint 82 is disclosed with some particularity in Figures 16, 17, and 15, but this specification will not be encumbered by a detailed description of the universal joint, because it is recognized that a brake mechanism cannot be characterized patentably by a specific universal joint construction. Let is suffice to state that the universal joint 82 serves to maintain the operative integrity of the shaft 81—83 when the axle 65 swings horizontally in the operation of steering. In order that the gear ring 74 may be supported for oscillatory rotary movement, it is supplied with oppositely disposed slots 76 receiving the attaching elements 77, which hold the gear ring for movement as aforesaid on the support 40a. An examination of Figure 12 will make it manifest that the slot 78 in the gear ring 74 is for the purpose of giving access to one of the worms 51.

In practical operation, when the shaft 83—81 is rocked, the pinion 80 cooperates with the internal gear 79 to rotate the ring 74, the external gears 73 cooperating with the pinions 72 to tilt the cams 55a, the cams 55a operating to advance the brake shoes 44a and 45a in the way hereinbefore described in connection with the corresponding parts 55, 44, and 45.

I claim:—

1. In a device of the class described, a wheel having inner and outer brake drums, means for directing air on the outer drum, when the wheel rotates, thereby to cool the outer drum, and means for directing air on the inner drum thereby to cool the drum and means for accelerating and equalizing the air current on the inner drum in relation to the air current on the outer drum.

2. A wheel having a brake drum, a cooling chamber adjacent the rear wall of the drum, a cooling chamber adjacent the periphery of the drum and in communication with the first-mentioned chamber, and means in said peripheral chamber for circulating a cooling medium through the connected chambers.

3. A wheel having a brake drum, a cooling chamber adjacent the rear wall of the drum and coextensive therewith, a cooling chamber adjacent the periphery of the drum and having inlet ports connecting it in communication with the first-mentioned chamber, said chambers having lateral air-openings, and means in the peripheral chamber for creating air currents in the rear chamber.

4. A wheel having a body disc flanged at its periphery to provide a brake drum on one side of the wheel and an air space on the opposite side, a rim mounted on the peripheral flange of the body disc, means spacing the rim and flange to provide an air passage therebetween, a rim-retaining cover disk bridging the flange on the air space side of the wheel and closing the said air space, the said body disc having openings adjacent its center forming air-intake ports for the said air space and the said flange having openings establishing communication between the air space and the said air passage, and means in said air passage for creating air currents.

5. A wheel comprising a hub, a brake drum secured thereto, a rim mounted on the peripheral flange of the brake drum and in spaced relation therewith to provide an air circulating passage opening laterally of the wheel, a closed air chamber at the rear of the drum having air-intake ports at its center portion and outlet ports at its periphery, said outlet ports opening into the said air circulating passage, and means in said passage for directing air currents across the said outlet ports of the said closed air chamber.

6. A wheel comprising a hub, a rim, an air chamber between the hub and rim, said chamber having a pair of radially spaced concentric flanges on one side thereof, each flange having on one face thereof a braking surface and the said chamber having an air port adjacent each flange and open to the face opposite the braking surface, and means at one of the said ports for directing air currents across the same.

7. A wheel having inner and outer brake drums, an air chamber on the side of each drum opposite to the braking surface thereof, a chamber connecting the air chambers of the drums, said connected chambers having a common air-inlet and a common air outlet, and means adjacent the outlet for drawing air currents through the said chambers.

8. A wheel having a chambered rim and a chambered hub presenting relatively confronting braking surfaces, the chamber of the said rim and hub being each provided with lateral air intake and air-exhaust ports opening on respectively opposite sides of the wheel, a chambered body portion connecting the hub and rim and secured to each adjacent one side of the respective braking surfaces, said body portion having its chamber provided at the hub-end with intake ports in registry with the exhaust ports of the hub-chamber and at its rim portion with escape ports communicating with the rim chamber, and means in said rim chamber for causing air to circulate through all the chambers.

In testimony whereof I affix my signature.

WALTER K. BURGESS.